June 12, 1951 G. FARNELL 2,556,841
RADIATION PYROMETER
Filed Oct. 17, 1947
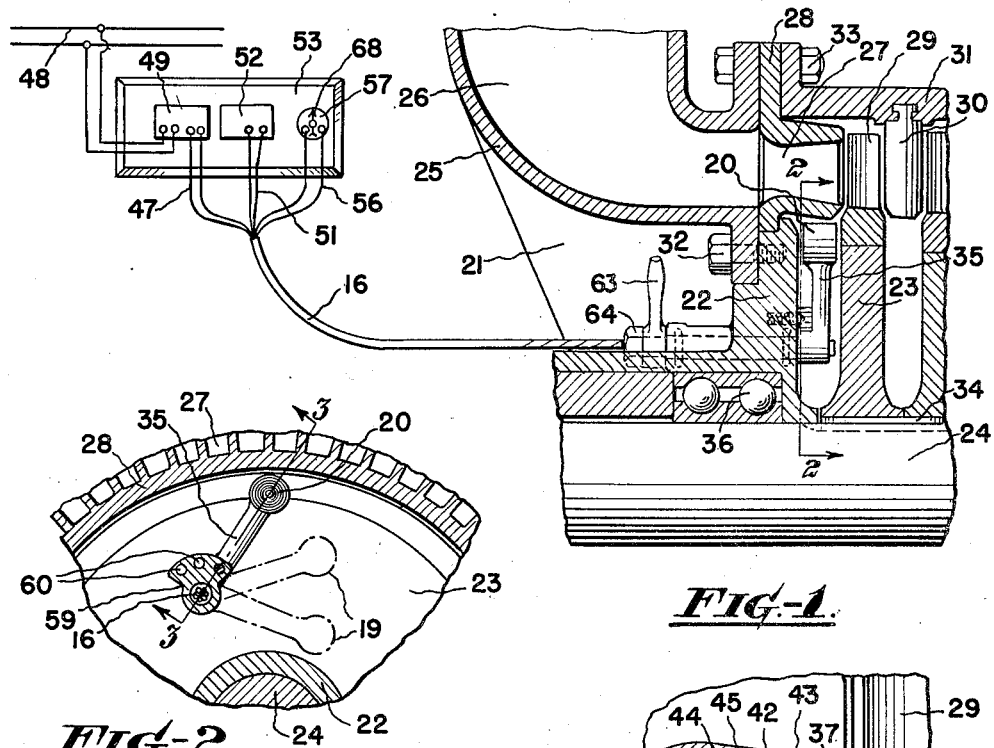
FIG.-1.
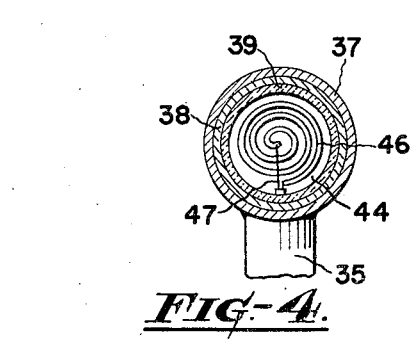
FIG.-2.
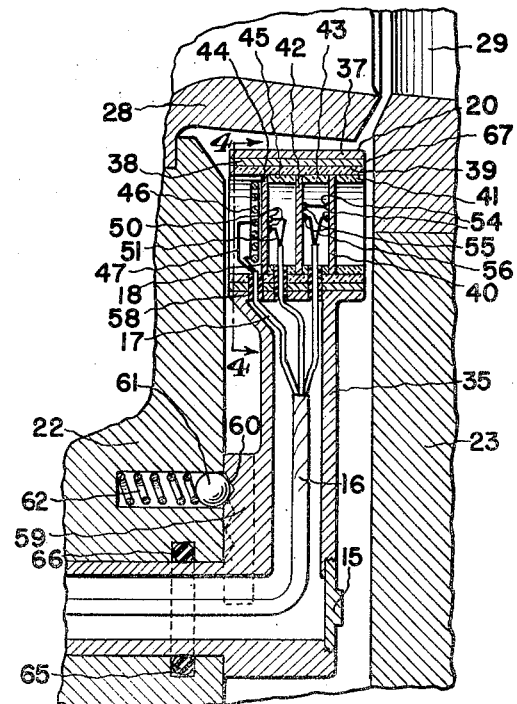
FIG.-4.
FIG.-3.
INVENTOR
George Farnell
BY
HIS ATTORNEY.

Patented June 12, 1951

2,556,841

UNITED STATES PATENT OFFICE 2,556,841

RADIATION PYROMETER

George Farnell, Phillipsburg, N. J., assignor to Ingersoll-Rand Company, New York, N. Y., a corporation of New Jersey Application October 17, 1947, Serial No. 780,555

7 Claims. (Cl. 73—355)

This invention relates to pyrometers, and more particularly to a radiation pyrometer for determining the temperature of a moving body. For example, it may be used to ascertain the temperature of a rotating turbine wheel where the high temperature of the gases creates, in the surrounding metal, a heat factor of primary importance.

One object of the invention is to provide a means for determining the temperature of a moving body without necessitating physical contact with the body.

Another object is to provide a simple means for ascertaining the temperature of a moving body, which is both compact and rugged so that it may be used in restricted places and for a wide range of temperatures.

Another object is to obtain the temperature at various points on a rotating wheel.

Other objects will be in part obvious and in part pointed out hereinafter.

In the drawings accompanying this specification and in which similar reference numerals refer to similar parts, Figure 1 is a sectional view of a portion of a turbine to which the invention may be advantageously applied, and also includes a schematic view of the electrical instrument board associated with the invention, Figure 2 is a transverse view taken through Figure 1 on the line 2—2, Figure 3 is a sectional elevation taken through Figure 2 along line 3—3, and Figure 4 is an end view of the pyrometer, partly in section, taken through Figure 3 along the line 4—4.

Referring more particularly to the drawings and at first to Figure 1, the radiation pyrometer, designated in general by 20, is shown applied to a turbine 21 which has an inner housing portion 22 partially enclosing a turbine wheel 23 which is locked to a shaft 24 with a key 34. A ball bearing 36 is interposed between the shaft 24 and the housing portion 22.

A housing portion 25 defines an inlet passage 26 for hot gas which operates the turbine 21. The gas passes through an orifice 27 in section 28 onto a turbine blade 29 attached to the turbine wheel 23, and a stationary turbine blade 30 attached to an outer housing portion 31. The portions of the housing are held together by means of a stud bolt 32 and a nut-bolt assembly 33.

A preferred form of the radiation pyrometer 20, constructed in accordance with the invention, includes an L-shaped holder 35, having a cylindrically formed head portion 37, adapted to hold the working parts of the pyrometer 20 close to the turbine wheel 23 and to make possible the obtaining of temperatures at various radial points 19 of the turbine wheel 23. It will be readily understood that the pyrometer 20 may be moved to the positions 19 by relatively moving a handle 63 attached, by means of a nut 64, to a portion of the holder 35 extending through the housing portion 22 to the exterior thereof. To hold the pyrometer 20 at these different radial points 19 on the turbine wheel 23, the holder 35 is provided with a plate 59 lying within the turbine 21 and having recesses 60 to engage with a ball 61 which is biased between the housing portion 22 of the turbine 21 and plate 59 by a spring 62. A flexible sealing ring 65, encircling the holder 35, is held in an annular recess 66 of the housing portion 22 to provide a tight fit between the housing portion 22 and the portion of the holder 35 extending therethrough.

A cylindrical metal container 38 is adapted to be telescopically engaged within the tubular head portion 37 of the holder 35 and is insulated, in this case, by a ceramic cylinder 39 which is so arranged in the container 38 to prevent the conduction of heat from the container 38 into the working parts of the pyrometer 20.

A metal plate 40, acting as a heat receiving member to absorb the radiant heat from the turbine wheel 23, is held in predetermined spaced relation with the turbine wheel 23 by means of an insulating spacer 41. A second heat receiving member, in this case a metal plate 42 preferably made of the same material as the plate 40, is spaced from the heat receiving plate 40 by an insulating spacer 43, and, the heat producing element, or radiator 44, is positioned in predetermined spaced relation with the heat receiving plate 42 by an insulating spacer 45. The radiator 44 is preferably made of the same material as the turbine wheel 23 so as to have substantially the same emission characteristic as the wheel 23.

A heater 46, positioned adjacent one surface 18 of the radiator 44, is connected by an electrical circuit 47 to the power supply line 48. A rheostat 49 for adjusting the amount of current passing through the heater 46 is connected in the circuit 47 and may be conveniently mounted on an instrument board 53. This affords a means for selectively effecting variations in the temperature of the radiator 44.

A thermocouple 50 is embedded in the surface of the radiator 44 which opposes the heat receiving plate 42, and is connected by an electrical circuit 51 to a suitable voltage measuring instrument, such as a potentiometer 52, which is shown mounted on the instrument board 53. By this means the temperature of the radiator 44 can be easily determined.

Two thermocouples 54 and 55 are connected in series opposition in a circuit 56 which has its terminals connected to a null voltage indicating instrument, or galvanometer 57, on the instrument board 53. By using these series connected thermocouples 54 and 55, one in each of the opposed surfaces of the heat receiving plates 40 and 42, a comparison of the temperatures of the plates 40 and 42 can be made.

The circuit 47 is insulated by means of a wire covering 17 and, on passing through the housing of the pyrometer 20, is further protected and insulated by a bushing 58. The wire circuits 51 and 56 are insulated in a manner similar to circuit 47, and all three insulated circuits are confined in a conduit 16 which extends through the holder 35 and to the instrument board 53. The portion of the conduit 16 located in the holder 35 is made readily accessible by removing a plug 15 which is threaded into an aperture in the elbow of the holder 35.

The essential purpose of the pyrometer 20 is to simulate in the radiator 44 the heat condition of the rotating turbine wheel 23, thus providing a way to easily determine the temperature of the rotating turbine wheel 23 by measuring the temperature of the stationary radiator 44.

When the plates 40 and 42 are of equal temperature, for example, before starting the turbine 21, a balanced condition in the circuit 56 is indicated by the pointer 68 on the galvanometer 57. In operation the turbine wheel 23 heats up due to the hot gases passing over the turbine blade 29. Since the plate 40 is well insulated and the forward end 67 of the pyrometer 20 is positioned close to the turbine wheel 23, radiant heat will be transmitted from the turbine wheel 23 to the heat receiving plate 40. The thermocouple 54, which is attached to the plate 40, also becomes heated causing a change in potential in the previously balanced galvanic circuit 56. This unbalanced condition is denoted by movement of the pointer 68.

To counteract this unbalanced condition the heat receiving plate 42, and consequently the thermocouple 55, must be heated to the same temperature as the plate 40. The rheostat 49 is adjusted to allow current to pass to the heater 46 which heats up quickly, causing the radiator 44 also to become heated. Since the radiator 44 and the plate 42 have opposed surfaces, radiant heat will be transmitted therebetween. The heat of the plate 42 is conveyed to the thermocouple 55 embedded therein causing a second change in potential in the circuit 56 which is opposite to the aforementioned change produced by the thermocouple 54. When the temperatures of the thermocouples 54 and 55 are equal, the pointer 68 on the galvanometer 57 will again indicate a balanced condition in the circuit 56. At this time the temperature of the radiator 44 is obtained by conversion of the millivolt reading of the potentiometer 52 which indicates the difference in potential caused by heating the thermocouple 59 in the circuit 51. Inasmuch as the plates 40 and 42 are heated in a similar manner, it is obvious that the radiator 44 and the turbine wheel 23 must be at the same temperature when the aforementioned balanced condition exists in the circuit 56.

From the foregoing description it will be apparent to those skilled in the art, that changes and modifications may be made without departing from the spirit of the invention or the scope of the claims. For example, the heat producing element of the pyrometer and its associated heat receiving member 42 may be employed at any remote point from the heat receiving plate 40. Also, two potentiometers, one connected to each of the thermocouples 54 and 55, can be used in place of the galvanometer to enable a comparison of the temperatures of the two heat receiving elements. It will be readily understood that the pyrometer may be used to ascertain the temperature of any metallic body where the heat factor of the metal is of primary importance.

I claim:

1. A radiation pyrometer, comprising a heat receiving member adapted to be placed in spaced relation with a moving body whose temperature is to be measured, a heat producing element of the same material as the moving body the temperature of which is to be measured, means for selectively effecting variations in the temperature of said element, a second heat receiving member in spaced relation with the heat producing element, means for comparing the temperatures of the heat receiving members, and means for measuring the temperature of the heat producing element.

2. A radiation pyrometer, comprising a heat receiving member adapted to be placed in predetermined spaced relation with a moving body the temperature of which is to be measured and to receive heat radiated therefrom, a heat producing element of substantially the same heat emission characteristic as the moving body the temperature of which is to be measured, means for selectively effecting variations in the temperature of said element, a second heat receiving member in spaced relation with the heat producing element for receiving radiant heat therefrom, means for indicating the relative temperatures of the heat receiving members, means for indicating the temperature of the heat producing element, and a container for the said heat receiving members and the heat producing element.

3. A radiation pyrometer, comprising a heat receiving member having a plane surface in face and spaced relation with a moving body whose temperature is to be measured and to receive heat radiated therefrom, a heater, means for selectively effecting variations in the temperature of said heater, a radiator positioned within heating distance of the heater, a second heat receiving member in predetermined spaced relation with the radiator for receiving radiant heat therefrom, means for indicating the relative temperatures of the heat receiving members, means for measuring the temperature of the radiator, and a container to receive the heat receiving members and the heater and the radiator.

4. A radiation pyrometer, comprising a heat receiving plate adapted to be placed in predetermined spaced relation with a moving body whose temperature is to be measured and to receive heat radiated therefrom, a heater, means for selectively effecting variations in the temperature of said heater, a radiator of substantially the same material as said body positioned within heating distance of the heater, a second heat receiving plate of substantially the same material as the first said plate and having a face exposed to and in predetermined spaced relation with the radiator for receiving radiant heat therefrom, means for enabling a comparison of the temperatures of the heat receiving plates, means for indicating the temperature of the radiator, an insulated container for the said heat receiving plates and the heater and the radiator, and spacers in the container to fix the position of the heat receiving plates and the radiator.

5. A radiation pyrometer, comprising a heat receiving plate adapted to be placed in predetermined spaced relation with a moving body whose temperature is to be measured and to receive heat radiated therefrom, a heater, means for selectively effecting variations in the temperature of said heater, a radiator of substantially the same material as said body and positioned within heating distance of the heater, a second heat receiving plate of substantially the same material as the first said plate in predetermined spaced relation with the radiator for receiving radiant heat therefrom, thermoelectrical means for enabling a comparison of the temperatures of the heat receiving plates, thermoelectrical means for indicating the temperature of the radiator, an insulated container for the said heat receiving plates and the heater and the radiator, and a holder adapted for positioning the container relative to the said body.

6. A radiation pyrometer, comprising a heat receiving plate adapted to be placed in predetermined spaced relation with a moving body whose temperature is to be measured and to receive heat radiated therefrom, a heater, means for selectively effecting variations in the temperature of said heater, a radiator positioned within heating distance of the heater, a second heat receiving plate in predetermined spaced relation with the radiator for receiving radiant heat therefrom, thermoelectrical means for enabling a comparison of the temperatures of the heat receiving plates, thermoelectrical means for indicating the temperature of the radiator, a thermally insulated container for the said heat receiving plates and the heater and the radiator, insulating spacers in the container to fix the position of the heat receiving plates and the radiator, a holder adapted to position the container relative to the said body, and means on the holder for selectively changing the position of the container with respect to said body.

7. A radiation pyrometer for measuring the temperature of a rotating wheel in a turbine housing, comprising a heat receiving plate adapted to be placed in predetermined spaced relation with the said wheel to receive heat radiated therefrom, a heater, means for selectively effecting variations in the temperature of said heater, a radiator positioned within heating distance of the heater, a second heat receiving plate interposed between the first said plate and the radiator and separated therefrom by an air space for receiving radiant heat from the radiator, thermoelectrical means for enabling a comparison of the temperatures of the heat receiving plates, thermoelectrical means for indicating the temperature of the radiator, a thermally insulated container for the said heat receiving plates and heater and the radiator, insulating spacers in the container to fix the position of the heat receiving plates and the radiator, a holder adapted to position the container relative to the rotating wheel and extending through an aperture in the turbine housing, and a lever on the holder for selectively changing the position of the container with respect to the rotating wheel.

GEORGE FARNELL.

REFERENCES CITED

The following references are of record in the file of this patent:

UNITED STATES PATENTS

| Number | Name | Date |
| --- | --- | --- |
| 1,643,582 | Martin | Sept. 27, 1927 |
| 1,761,392 | Hase | June 3, 1930 |
| 1,907,540 | Hebler | May 9, 1933 |
| 2,114,029 | Perry | Apr. 12, 1938 |
| 2,305,396 | Volochine | Dec. 15, 1942 |
| 2,466,137 | Vollrath | Apr. 5, 1949 |

OTHER REFERENCES

Publication, "Measurement of Surface Temperatures," by W. F. Roeser et al., Bureau of Standards Research, Paper 231, vol. 5, Oct. 1930, pages 793 to 797.

Publication, "Measurement of Surface Temperatures," by Boyer et al., Industrial and Engineering Chemistry, vol. 18, #7, July 1926, pages 728, 729.